(12) United States Patent
Chiba et al.

(10) Patent No.: US 7,259,937 B2
(45) Date of Patent: Aug. 21, 2007

(54) MAGNETIC RECORDING DEVICE HAVING A HEAD SLIDER UTILIZING A WATER-REPELLANT RESIN LUBRICANT HAVING SPECIFIED SURFACE TENSION PROPERTIES

(75) Inventors: Hiroshi Chiba, Kawasaki (JP); Keiji Watanabe, Kawasaki (JP); Yoshiharu Kasamatsu, Kawasaki (JP); Takayuki Musashi, Kawasaki (JP); Yukiko Oshikubo, Kawasaki (JP); Eishin Yamakawa, Higashine (JP); Takeshi Toukairin, Higashine (JP); Jun Watanabe, Kawasaki (JP); Norikazu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 11/052,471

(22) Filed: Feb. 8, 2005

(65) Prior Publication Data

US 2005/0264937 A1    Dec. 1, 2005

(30) Foreign Application Priority Data

May 26, 2004   (JP) .............................. 2004-156468
Nov. 30, 2004  (JP) .............................. 2004-345644

(51) Int. Cl.
   *G11B 5/60* (2006.01)
(52) U.S. Cl. ................................. 360/235.1; 360/235.4

(58) Field of Classification Search ............. 360/234.3, 360/235.1, 235.4
See application file for complete search history.

(56) References Cited

U.S. PATENT DOCUMENTS 6,246,538 B1 *  6/2001  Kasamatsu et al. ....... 360/97.01
6,927,942 B2 *  8/2005  Tani et al. ................ 360/235.6

FOREIGN PATENT DOCUMENTS

| JP | 7-85438 | 3/1995 |
| JP | 9-219077 | 8/1997 |
| JP | 11-16313 | 1/1999 |

* cited by examiner

*Primary Examiner*—A. J. Heinz
(74) *Attorney, Agent, or Firm*—Westerman, Hattori, Daniels & Adrian, LLP.

(57) ABSTRACT

A head slider to which little amount of contaminants is adhered, that can form a uniform and flat head lubricant layer surface and that has excellent ultra-low floating properties, as well as a magnetic recording device equipped with the head slider are provided. The head slider is equipped with a head slider lubricant layer having an average film thickness of not more than 2.5 nm, and composed of a water-repellent resin, the lubricant layer being formed on the head slider surface and head slider protection layer surface facing the magnetic recording medium, and the surface tension of the head slider lubricant layer determined by the Fowkes equation is not more than those of the head slider surface and head slider protection layer surface.

14 Claims, 6 Drawing Sheets

MAGNETIC RECORDING DEVICE HAVING A HEAD SLIDER UTILIZING A WATER-REPELLANT RESIN LUBRICANT HAVING SPECIFIED SURFACE TENSION PROPERTIES

CROSS-REFERENCE TO RELATED APPLICATIONS

This application is based upon and claims the benefit of priority from the prior Japanese Patent Application No. 2004-156468, filed on May 26, 2004 and No. 2004-345644, filed on Nov. 30, 2004, the entire contents of which are incorporated herein by reference.

BACKGROUND OF THE INVENTION

1. Field of the Invention

The present invention relates to a head slider of a magnetic recording device.

2. Description of the Related Art

In a magnetic recording device, a head slider equipped with a record transducer (also simply referred to as "head" in the present invention) reads and writes information, while floating over a hard disk or a magnetic recording medium.

The distance between the head and a magnetic layer that records (writes) and/or reproduces (reads) magnetic information on the hard disk, is called a magnetic spacing. The smaller the magnetic spacing is, the more improved the recording density is. Accordingly, the present level of the floating gap for a head has become as small as 10 nm or less as a result of a strong need for higher recording density in recent years. In such an ultra-small floating gap, only a small amount of contaminants adhered onto a head slider may make the floating stability of the head greatly out of balance.

Volatile organic materials, debris. etc. brought about from the environment are examples of such contaminants. As the head slider moves, volatile organic materials, debris. etc. adhered to the hard disk are scraped together and collected on the head slider, and eventually fill in the head floating gap, resulting in head crashing.

Various methods are suggested to solve the problem described above. For example, a method is proposed to restrain adhesion of contaminants by providing a head slider surface that faces a magnetic recording medium (also simply referred to as "head slider surface" in the present specification) with patterning so as to decrease the surface energy (see Japanese Unexamined Patent Application Publication No. H09-219077). However, this method has a disadvantage that a high production cost is inevitable for the manufacturing of head sliders.

Also, a method is suggested in which a self-assembled membrane is formed on the head slider surface to decrease the surface energy (see, for example, Unexamined Patent Application Publication No. H11-16313). However, the film thickness of the self-assembled membrane (or the length of a molecular chain) is rather large, requiring wide magnetic spacing. Accordingly, this is not suitable for a higher recording density. Furthermore, the self-assembled membrane employed in this method comprises silicon that is known as a substance that tends to bring about head crashing. This also makes a drawback against the practical application.

Furthermore, it is proposed to decrease the adhesion of contaminants by applying a lubricant that is the same as or resembles to a lubricant applied to a hard disk, onto the head slider surface and the surface of a head slider protection layer (also referred to as "head protection layer" in the present specification), followed by UV-ray irradiation so as to lower the surface energy (see Japanese Unexamined Patent Application Publication No. H07-85438, for example). However, this method is disadvantageous in the following point. It is known in general that the lubricant is transferred from the disk surface to the head slider surface side by means of evaporation from the disk and intermittent contact with the head slider, etc., with the result that a film as thick as the lubricant layer on the disk is formed on the outermost head slider surface facing the disk (also referred to as "ABS" that is an abbreviation of "air bearing surface"). In a device having a sufficiently wide floating gap, such lubricants adhered to the ABS have been posing little problem. However, as the floating gap has been made smaller, it has come to be generally known that this behavior makes the floating of the head unstable. It is understood that the floating is obstructed by the lubricant on the ABS contacting with the disk, and forming a liquid bridge.

One advantage of this method is that the liquid lubricant layer is made into a solid form by fixing the lubricant applied to the head slider by means of UV ray irradiation, thus leaving the liquid bridging less liable to occur. However, simple application of such a lubricant having a polar molecular end group as disclosed in Japanese Unexamined Patent Application Publication No. H07-85438 will incur coagulation of the lubricant due to its cohesive force, and accordingly, not only solidifying of the lubricant with UV ray irradiation will result in uneven coating but also the height of the coagulated lubricant occupies a substantial portion of the floating gap, sometimes resulting in floating problems such as failure of floating of the head slider, head crashing, scratching of the magnetic recording medium, etc. Also, depending on the level of UV ray irradiation, part of the head slider lubricant layer (also referred to as "head lubricant layer" in the present invention) may exist as a liquid. Such part will still cause liquid bridging, letting down the expected effect.

As described above, it is difficult to achieve both of reduction of adhered contaminants to a head slider and ultra-low floating properties of the head slider. There is also a problem of coagulation of a resin that forms the head lubricant layer. Accordingly, there is a need for solving these problems. It is an object of the present invention to solve these problems, and provide technologies that can achieve reduction of adhered contaminants on a head slider, prevention of coagulation of a resin for forming the head lubricant layer, and ultra-low floating properties of the head slider. Other objects and advantages of the present invention will be clarified through the following explanation.

SUMMARY OF THE INVENTION

According to one aspect of the present invention, a head slider equipped with a record transducer (or a head) for recording information onto and/or reproducing information from a magnetic recording medium is provided, wherein a head slider lubricant layer having an average film thickness of not more than 2.5 nm, and composed of a water-repellent resin, is formed on the head slider surface and head slider protection layer surface facing the magnetic recording medium, and the surface tension of the head slider lubricant layer determined by the Fowkes equation is not more than those of the head slider surface and head slider protection layer surface.

According to another aspect of the present invention, provided is a head slider equipped with a record transducer (or a head) for recording information onto and/or reproducing information from a magnetic recording medium, wherein: a head slider lubricant layer having an average film thickness of not more than 20% of the floating gap that is provided when the head slider lubricant layer is not installed, and composed of a water-repellent resin, is formed on a head slider surface and head slider protective layer surface facing the magnetic recording medium; and the surface tension of the head slider lubricant layer determined by the Fowkes equation is not more than those of the head slider surface and head slider protective layer surface.

For both aspects, preferable are that the head slider lubricant layer is substantially chemically bonded to the head slider surface and head slider protection layer surface, that the rate of adhesion of the head slider lubricant layer to the head slider surface and head slider protection layer surface is not less than 85%, particularly that the head slider lubricant layer is formed through subjecting to washing with a solvent, that the head slider lubricant layer is formed through subjecting to irradiation with active energy rays having high energy such as xenon excimer rays, electron beams or the like, that the head slider lubricant layer comprises a fluororesin such as a fluorinated hydrocarbon that may be branched, a fluorinated polyether that may be branched, a mixture thereof, or the like, that at least part of the molecular end groups of the fluororesin are trifluoromethyl groups, and other similar embodiments.

According to the present invention, a head slider is provided that has little adhesion of contaminants, can have a uniform and flat head lubricant layer surface formed, and furnishes excellent ultra-low floating properties.

According to another aspect of the present invention, a magnetic recording device equipped with the above-described head slider is provided. It is preferable that the head slider is operated by the loading-unloading mechanism or the contact-start-stop mechanism. It is also preferable that the head slider records and/or reproduces information by a process selected from the group consisting of the completely floating method, the gas-liquid mixing method and the contact method.

According to the present invention, a head slider that has little adhesion of contaminants, can have a uniform and flat head lubricant layer surface formed, and furnishes excellent ultra-low floating properties, as well as a magnetic recording device equipped with the head slider is provided.

DESCRIPTION OF THE PREFERRED EMBODIMENTS

Embodiments according to the present invention will be described with reference to the following figures, examples, etc. It is to be understood that these figures, examples, etc., plus the explanation below are for the purpose of illustrating the present invention, and do not limit the scope of the present invention. It goes without saying that other embodiments should also be included in the category of the present invention as far as they conform to the gist of the present invention. In the figures, the same sign indicates the same element. It is to be noted that the "record transducer (or head)", "recording medium" and "magnetic recording device" according to the present invention are applicable to recording (writing) only of magnetic information, reproducing (reading) only of magnetic information and both of the recording and reproducing of magnetic information.

In the following, the present invention will be explained mainly on hard disk devices. However, besides those for hard disk devices, any type of head slider may be a "head slider" according to the present invention, including one that operates by the loading-unloading mechanism, one that operates by the contact-start-stop mechanism, one that records and/or reproduces information by the completely floating method, one that records and/or reproduces information by the gas-liquid mixing method, and one that records and/or reproduces information by the contact method. Also, any recording medium may be a "magnetic recording medium" according to the present invention, including a longitudinal recording medium, an SFM (Synthetic Ferri Coupled Medium), a perpendicular recording medium, and a patterned recording medium used for hard disk devices. Any magnetic recording device using such a magnetic recording medium is included in the "magnetic recording device" according to the present invention.

Figure 1:
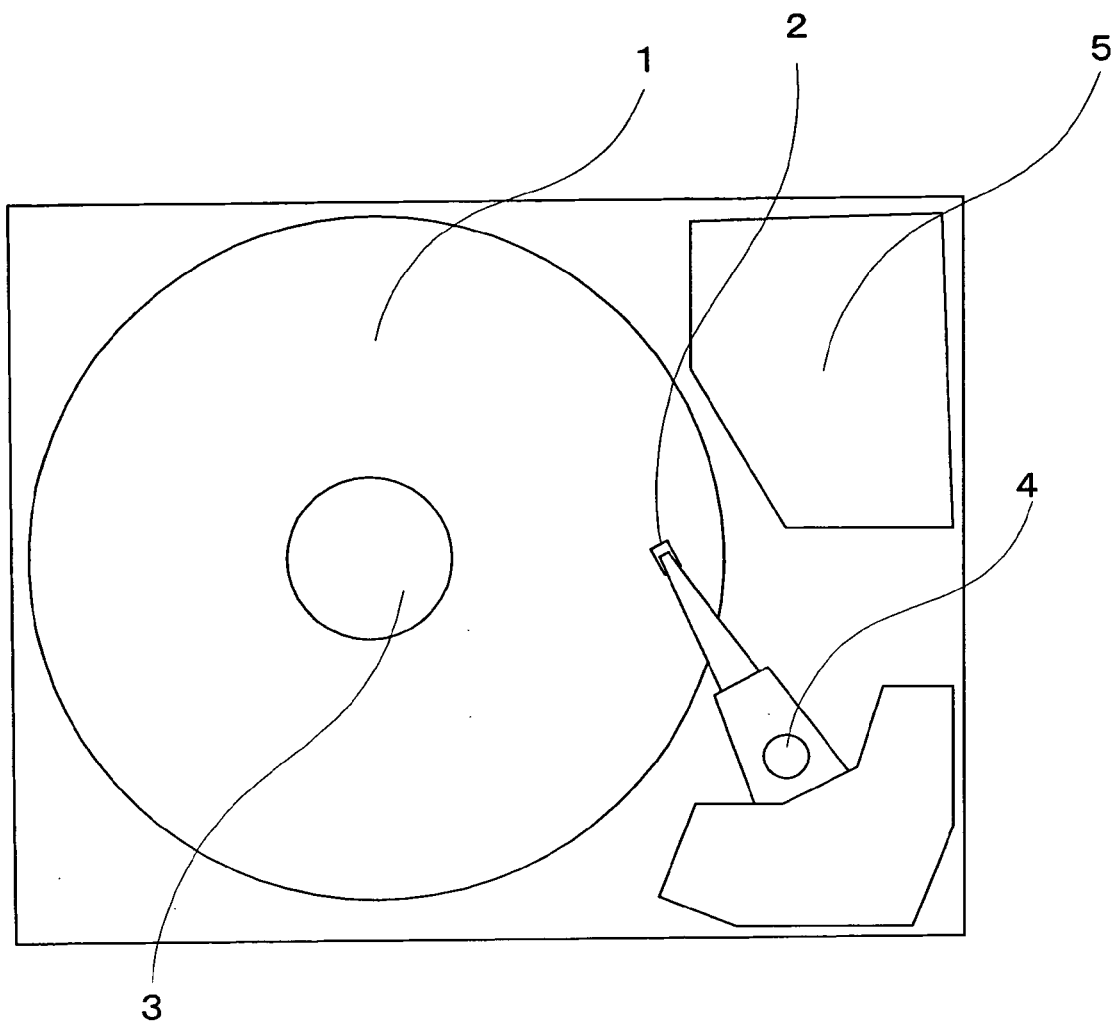
FIG. 1 is a schematic plan view illustrating the internal structure of a hard disk device.
Figure 2:
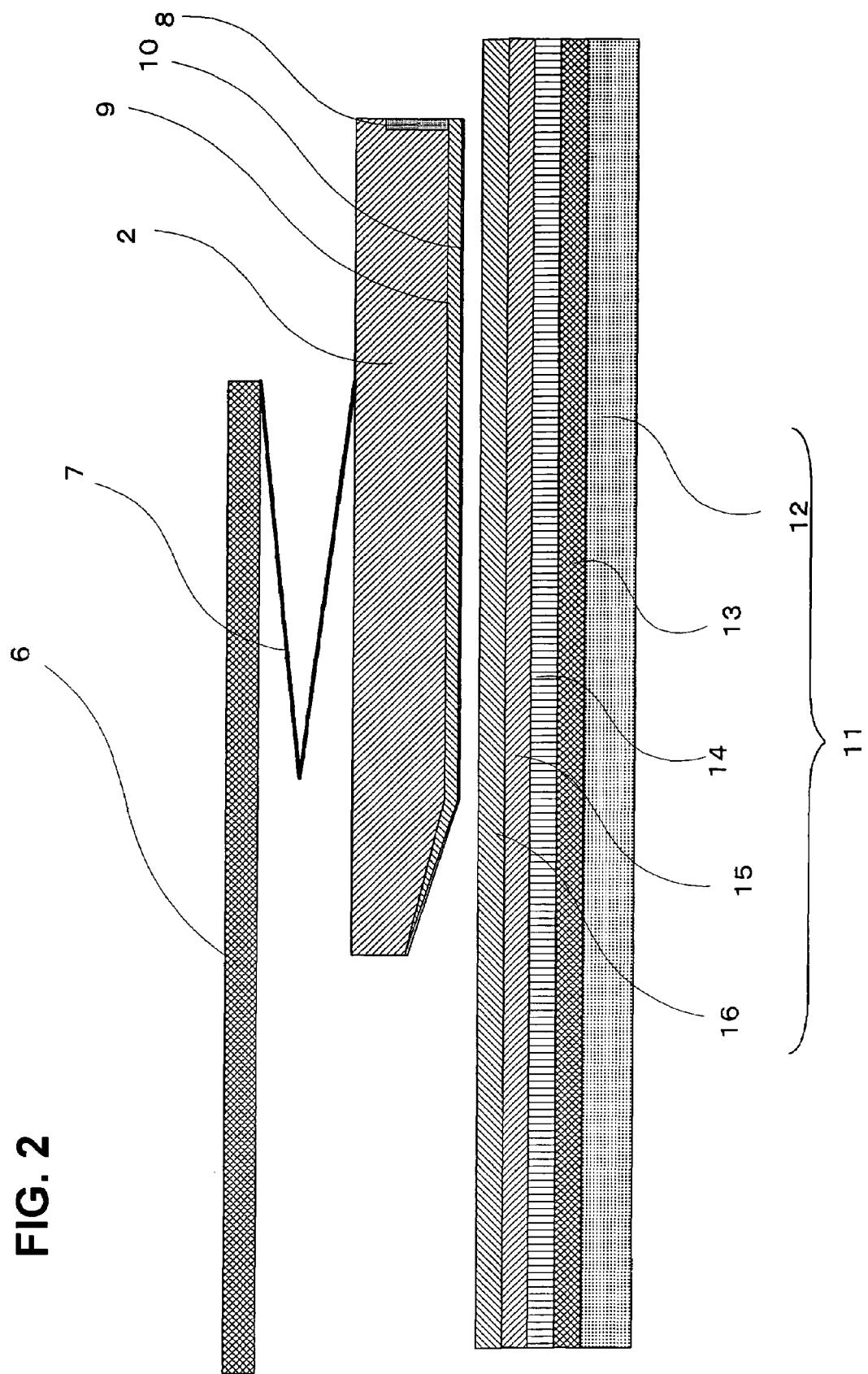
FIG. 2 is a schematic side cross-sectional view illustrating the relationship between a head and a magnetic recording medium of a hard disk device.

FIG. 1 is a schematic plan view illustrating the internal structure of a hard disk device, and FIG. 2 is a schematic side cross-sectional view illustrating the relationship between a head and a magnetic recording medium of a hard disk device (a view taken as the device is cut along the direction vertical to the magnetic layer of the magnetic recording medium).

This hard disk device comprises, as major constituents, a magnetic recording medium 1, a head slider 2 equipped with a head, a rotation control mechanism (a spindle motor, for example) 3 of the magnetic recording medium 1, a head positioning mechanism 4 and a recorded/reproduced signal processing circuit (such as a read-write amplifier) 5, as shown in FIG. 1.

The head slider 2 is connected with the head positioning mechanism 4 by a suspension 6 and a gimbal 7 for flexibly supporting the head slider 2, as illustrated in FIG. 2. A head 8 is mounted on the tip of the head slider 2. A head protection layer 9 and a head lubricant layer 10 are installed on the head slider surface.

In many cases, the head protection layer covers not the whole but part of the head slider surface. Accordingly, the "head slider lubricant layer" according to the present invention often contacts with the head slider surface itself as well as the head protection layer. In the present invention, when the whole head slider surface is covered with the head protection layer, the "head slider surface and head slider protection layer surface" is the head slider surface, and when part of the head slider surface is covered with the head protection layer, the "head slider surface and head slider protection layer surface" means both the surfaces. It is to be noted that a head slider lubricant layer is sometimes called a head lubricant layer in this specification.

For a hard disk, the thickness of a head lubricant layer is from about 1 to about 2 nm, and the thickness of a head protection layer is from about 3 to about 5 nm, in general.

The following explanation in this specification will be made on a structure where the head protection layer covers part of the head slider surface, and the head lubricant layer covers the head slider surface and head protection layer surface.

A magnetic recording medium 11 has, in the direction from the bottom to the top of FIG. 2, a substrate 12, a Cr base layer 13, a magnetic layer 14, a magnetic recording medium protection layer (also referred to as medium protection layer, hereinafter) 15, a magnetic recording medium lubricant layer (also referred to as medium lubricant layer, hereinafter) 16, etc. There are cases in which a seed layer or other layers are also installed. However, these layers are omitted in the figure. For a hard disk, the thickness of the medium lubricant layer is from about 1 to about 2 nm, the thickness of the medium protection layer is from about 3 to about 5 nm, the thickness of the magnetic layer is about 20 nm, and the thickness of the Cr base layer is about 10 nm, in general.

It is useful that a head lubricant layer having an average film thickness of not more than 2.5 nm, and composed of a water-repellent resin, is formed on the head slider surface and head protection layer surface, to stabilize the floating of a head slider equipped with a record transducer (or a head) for recording and/or reproducing information with an ultra-small floating gap (about 10 nm, for example) over a magnetic recording medium, without applying any special patterning onto the head slider surface and head protection layer surface. The average film thickness is preferably not more than 1.5 nm. Through this, the ABS is uniformly covered with the water-repellent resin, making adherence of volatile organic materials, debris, etc. difficult. A head lubricant layer composed of a water-repellent resin preferably has a contact angle when measured with water of 70° or more.

Figure 3:
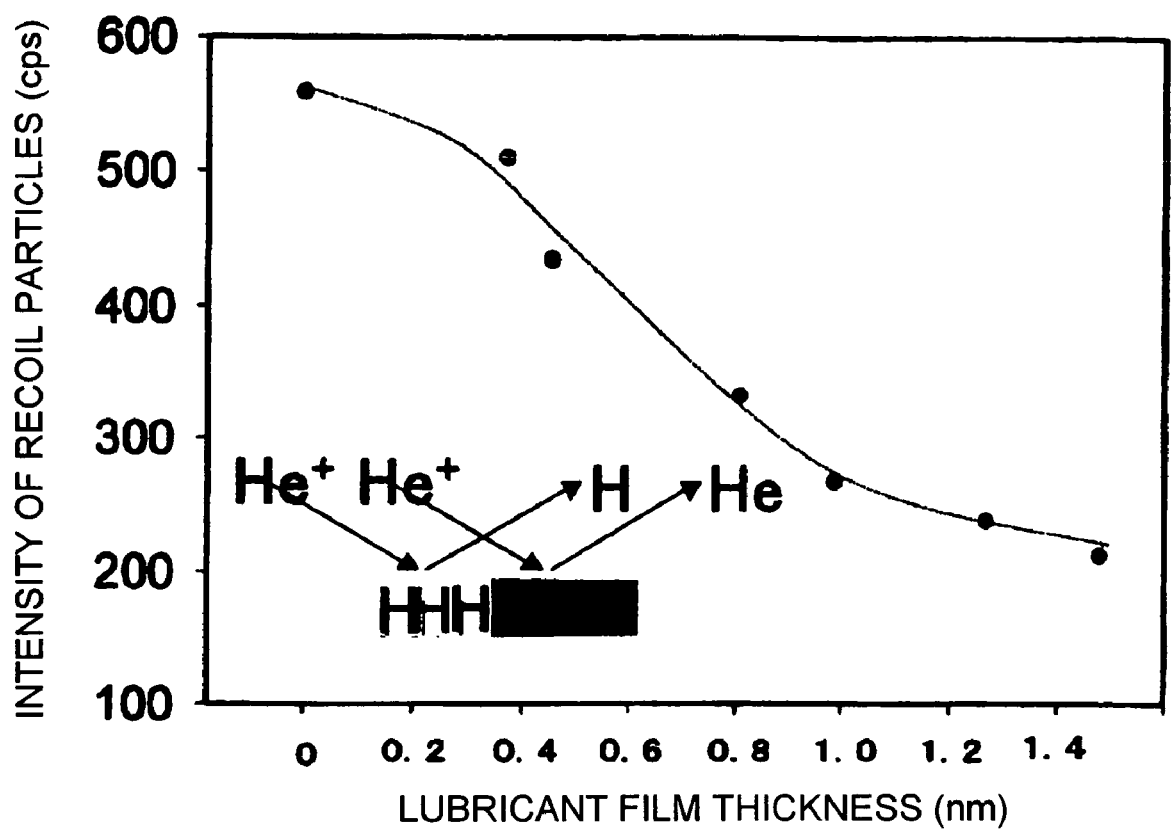
FIG. 3 is a graph indicating the relationship between the intensity of recoil particles and the lubricant film thickness.

The reason for choosing the average film thickness of not more than 2.5 nm and preferably not more than 1.5 nm is as follows. First, the relationship between the intensity of recoil particles (hydrogen) and the average film thickness was examined. FIG. 3 indicates the relationship between the intensity of recoil particles and the lubricant film thickness, when a magnetic disk in which a hydrogen-containing amorphous carbon is layered on a substrate is used, and a perfluoropolyether (molecular weight of 9,500) having a trifluoromethyl group at its end is used as a lubricant. The smaller the intensity of recoil particles is, the more the substrate surface is covered with the lubricant. From FIG. 3, it is understood that when the thickness is about 1 nm, the substrate surface is covered with the lubricant, and accordingly, if the thickness is 1.5 nm or more, it is more than enough. This probably means that at least a one-molecule layer of the lubricant is formed. On the other hand, it is not desirable that the lubricant film thickness is unnecessarily large in view of the above-described various problems. Therefore, a state is preferable in which a one or two-molecule layer or the like of the lubricant is formed.

Figure 4:
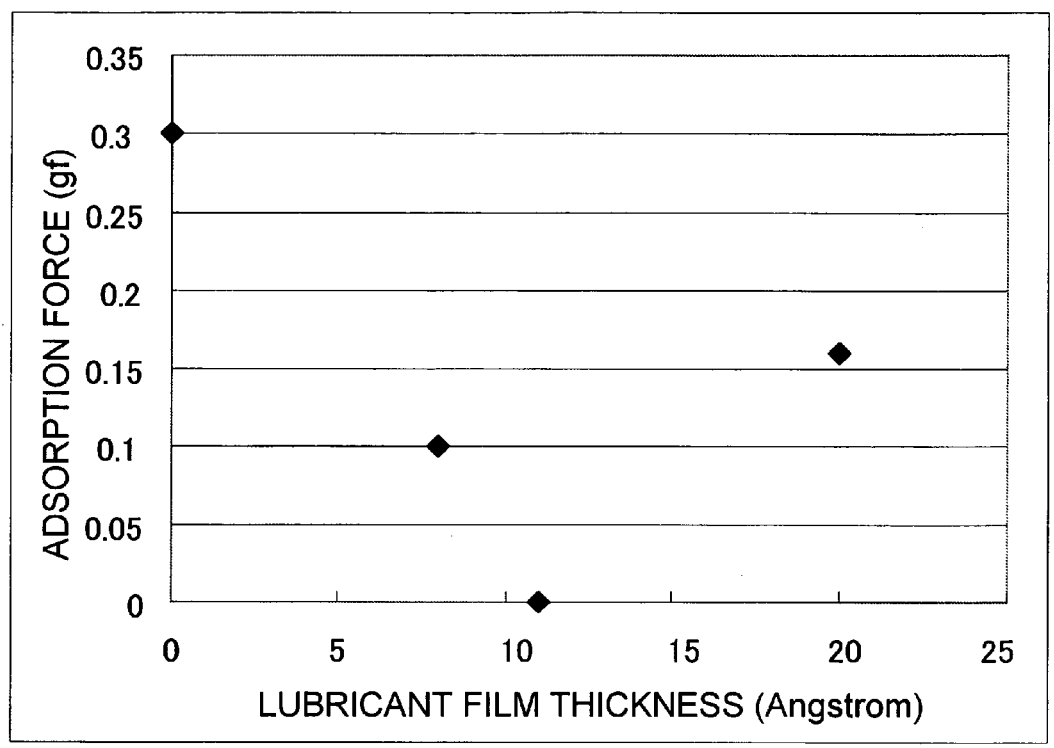
FIG. 4 is a graph indicating the relationship between the force to peel off a head slider from a disk and the lubricant film thickness.

Furthermore, when seen from the viewpoint of the force to peel off a head slider from a disk, the lubricant film thickness shows a behavior as shown in FIG. 4, indicating a low value at about 1 to about 2 nm. The adsorption power on the ordinate in FIG. 4 is a force to lift up a head slider placed on a magnetic recording medium.

Figure 5:
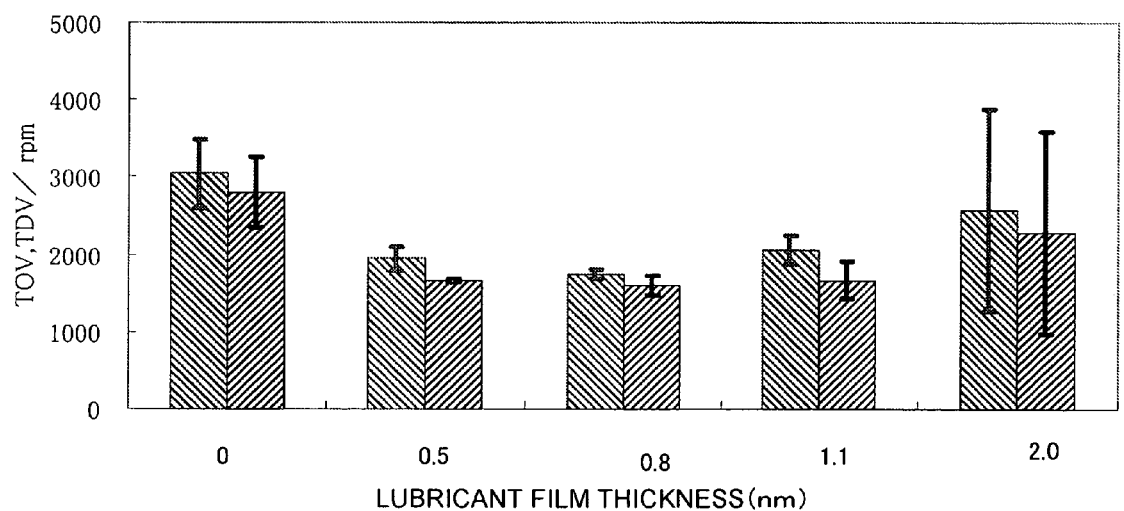
FIG. 5 is a graph indicating the relationship between TOV, TDV and the film thickness of a head lubricant layer.

Furthermore, FIG. 5 is a graph indicating the relationship between the film thickness of the head lubricant layer, and TOV (take-off velocity) or TDV (take-down velocity), when a hard disk medium is used. It can be considered that the smaller the TOV or TDV is, the better the head floating stability is. From this figure, it can be considered that the film thickness is preferably larger than 0 nm and smaller than about 2.0 nm.

Furthermore, the relationship between the film thickness of the head lubricant layer, and the touchdown altitude and take-off altitude, and the relationship between the change of magnetic spacing obtained from the magnetic transducing properties, and the film thickness were studied.

As a result, the relationship between the film thickness of the head lubricant layer, and the touchdown altitude and take-off altitude, indicated that a thicker film thickness is preferable at least up to 2 nm; and the relationship between the change of magnetic spacing and the film thickness, indicated that an average film thickness up to 2.5 nm can be accepted when the statistical fluctuation is considered.

From these results, it can be understood that the average film thickness must be 2.5 nm or less, and is preferably 1.5 nm or less. It is to be noted that the average film thickness according to the present invention may be measured by any known method. For example, X-ray photoelectron spectroscopy, Fourier transform infrared spectroscopy, a method using an ellipsometer, etc. can be applied.

From the relationship with the head floating gap, it is considered that a head lubricant layer is acceptable that has an average film thickness of not more than 20% of the floating gap that is provided when the head slider lubricant layer is not installed as shown in EXAMPLE 5.

It is preferable that the head lubricant layer composed of a water-repellent resin is substantially chemically bonded to the head slider surface and head slider protection layer surface in order to stabilize the floating of such a head slider. Here, the term "substantially chemically bonded" does not require to confirm that the chemical bonding has actually occurred. It is sufficient if the amount of adsorbed materials is not more than several wt. %.

Since part of a lubricant that is adsorbed onto a head slider surface and head protection layer surface with a weak adsorption power such as physical adsorption can be an obstacle to the floating at the operation of the head slider, it is possible to obtain a uniform and solid-like head lubricant layer that has no or little lubricant part with such a weak adsorption power, by making the layer substantially chemically bonded to the head slider surface and head slider protection layer surface. Hereupon, the "solid-like layer" means a layer that is not easily deformed by a physical contact as compared with a liquid that is easily deformed. If the head lubricant layer is liquid-like, contaminants will break down the layer, and are deposited on the head slider surface and head protection layer surface beneath the layer. When the solid-like layer is formed to be firmly held onto the head slider surface and head protection layer surface, it is possible to prevent such a phenomenon.

The adhesion rate of a head lubricant layer to a head slider surface and head slider protection layer surface is preferably not less than 85%. Specifically, the rate can be determined by subjecting a head lubricant layer composed of a water-repellent resin to extraction with a solvent such as 2,3-dihydrodecafluoropentane and hexafluoroisopropanol, measuring the film thickness of the head lubricant layer at a steady state, and dividing the film thickness of the layer after the extraction by the film thickness of the layer before the extraction. The film thickness is an average thickness. The extraction can be conducted until the film thickness indicates a constant value. Usually about one minute is sufficient. The film thickness can be measured, using X-ray photoelectron spectroscopy, Fourier transform infrared spectroscopy, a method using an ellipsometer, etc. as explained before. Otherwise, the rate can be determined by the ratio of the weight of the material that has not been extracted to the weight before the extraction, wherein the weight of the material that has not been extracted is determined when the extraction amount reaches a steady state. The adhesion rate of a head slider lubricant layer to a head slider surface and head slider protection layer surface facing a magnetic recording medium is more preferably not less than 95%, and still more preferably not less than 98%.

To satisfy such conditions, it is useful to wash the head lubricant layer with a solvent, and to irradiate the head lubricant layer with active energy rays having high energy. By the washing, it is possible to remove a lubricant part that is weakly adsorbed with physical adsorption or the like on the head slider surface and head protection layer surface. Fluorinated solvents such as 2,3-dihydrodecafluoropentane and hexafluoroisopropanol are examples of solvents for this purpose. It is considered that irradiation with active energy rays having high energy facilitates chemical bonding between the head lubricant layer, and the head slider surface and head protection layer surface. UV rays, excimer rays, X-rays, electron beams, focused ion beams, etc. can be used as the active energy rays having high energy. Xenon excimer rays and electron beams are particularly preferable. Irradiation time can be determined appropriately. In the case of xenon excimer rays, several seconds will be usually sufficient for the irradiation.

A head lubricant layer having properties as described above can be formed from any material as long as it does not contradicts the gist of the present invention, preferably comprising a fluororesin. As a fluororesin for the purpose, fluorinated hydrocarbons that may be branched, fluorinated polyethers that may be branched, or a mixture thereof can be enumerated. Perfluorinated hydrocarbons that may be branched, perfluoropolyethers that may be branched, or a mixture thereof are more preferable. The more the fluorine content in a molecule is, the less the coagulation properties are, and accordingly, it is possible to form a uniform layer with a smaller surface tension. Regarding the fluorine content, the ratio of the mole numbers of fluorine to the total mole number of fluorine and hydrogen in a molecule is preferably not less than 80%, more preferably not less than 90%, and still more preferably not less than 95%. It is to be noted that the weight-average molecular weights of these resin are preferably in the range of from 2,000 to 20,000.

The head lubricant layer preferably contains not less than 95 wt. % of a fluororesin. More preferably, it substantially consists of a fluororesin except minor components such as a catalyst.

It was found that even if such conditions are adopted, the lubricant may be coagulated and the coagulation itself can narrow the magnetic spacing, unless the surface tension of the head lubricant layer is made not more than those of the head slider surface and head protection layer surface. For example, commonly used perfluoropolyether lubricants have a functional group at the molecular end, owing to which the coagulation energy of the site is relatively large, and accordingly, they tend to have a structure in which the perfluoropolyether main chain part wraps around the functional group as its center. When the surface tension of the head lubricant layer is made not more than those of the head slider surface and head protection layer surface, such propensity can be prevented.

Measurement of the surface tension of a lubricant by the generally applied pendant-drop method or plate method does not reflect the characteristics of the molecular end groups, and accordingly, it is not sufficient as an indicator.

It was found, in contrast, that the values through the Fowkes equation from the measurement of contact angles of two or more different liquids on a lubricant formed in a thickness of from about 1 to several μm on a substrate composed of a resin for forming a head lubricant layer, reflects the characteristics of the molecular end groups and serves the purpose well as an indicator. The "surface tension of a head slider lubricant layer determined by the Fowkes equation" in the present invention means a value obtained by the above-described conditions. As the liquids for use in the measurement of contact angles for the purpose, water, diiodomethane ($CH_2I_2$), formamide, etc. are enumerated. The surface tension value of a head slider lubricant layer determined by the Fowkes equation is preferably not more than 30 mN/m. It is to be noted that the Fowkes equation is expressed as follows.

When $\gamma_S$ is a surface free energy of a solid sample, $\gamma_L$ is a surface free energy of a liquid sample, $\theta_{SL}$ is a contact angle of a solid sample/liquid sample, and $\gamma_{SL}$ is an interfacial free energy of a solid sample/liquid sample, then the Young's equation as shown in equation (1) holds.

$$\gamma_s = \gamma_L \cdot \cos\theta_{SL} + \gamma_{SL} \quad (1)$$

On the other hand, the adhesion work $W_{SL}$, or an energy for the stabilization by adherence of a liquid to the surface of a solid, follows the Dupre equation (2).

$$\gamma_S + \gamma_L = W_{SL} + \gamma_{SL} \quad (2)$$

The Young-Dupre equation (3) is derived from the two equations, and accordingly, the adhesion work can be obtained from the surface free energy and a contact angle of a liquid.

$$W_{SL} = \gamma_L(1 + \cos\theta_{SL}) \quad (3)$$

Equation (4) holds when the geometric mean rule for each surface free energy component is applied to the adhesion work.

$$W_{SL} = 2\sqrt{(\gamma_S^d \cdot \gamma_L^d)} + 2\sqrt{(\gamma_S^h \cdot \gamma_L^h)} \quad (4)$$

Here, d and h are a dispersion component and a hydrogen bonding component, respectively.

The following relationship holds regarding the adhesion work when two different liquids (i,j) are used.

$$\begin{pmatrix} W_{SL}^i \\ W_{SL}^j \end{pmatrix} = 2 \begin{pmatrix} \sqrt{\gamma_L^{d,i}} & \sqrt{\gamma_L^{h,i}} \\ \sqrt{\gamma_L^{d,j}} & \sqrt{\gamma_L^{h,j}} \end{pmatrix} \begin{pmatrix} \sqrt{\gamma_S^d} \\ \sqrt{\gamma_S^h} \end{pmatrix} \quad (5)$$

Accordingly, if the adhesion work is determined through actually measuring contact angles for two different liquids, the surface free energy of a solid can be obtained for each component by the following relationship. This relationship is called the Fowkes equation. Furthermore, the surface free energy: $\gamma = \gamma^d + \gamma^h$ can be obtained from the relationship.

$$\begin{pmatrix} \sqrt{\gamma_S^d} \\ \sqrt{\gamma_S^h} \end{pmatrix} = \frac{1}{2} \begin{pmatrix} \sqrt{\gamma_L^{d,i}} & \sqrt{\gamma_L^{h,i}} \\ \sqrt{\gamma_L^{d,j}} & \sqrt{\gamma_L^{h,j}} \end{pmatrix}^{-1} \begin{pmatrix} W_{SL}^i \\ W_{SL}^j \end{pmatrix} \quad (6)$$

It was found that according to the measurement of surface tension by the method, a perfluoropolyether with molecular end groups at least part of which are trifluoromethyl groups, has a small surface tension, which can be made not more than those of the head slider surface and head protection layer surface, and therefore, can wet and spread thinly over the head slider surface and head protection layer surface.

When a perfluoropolyether having a trifluoromethyl group at the molecular end forms a layer, a one or two-molecule film, which has a thickness of about 1 nm, provides sufficient water repellent properties. Since such a resin has no polar functional groups and has only a small power to coagulate with a lubricant for forming a medium lubricant layer, the surface tension can be made not more than those of the head slider surface and head protection layer surface, and can wet and spread thinly over the head slider surface and head protection layer surface, thus preventing migration of the lubricant to the ABS. It is considered that such a tendency is the same with other fluororesins such as perfluorohydrocarbons.

In other words, a head slider equipped with a head lubricant layer having an average film thickness of not more than 2.5, or having an average film thickness of not more than 20% of the floating gap that is provided when the head slider lubricant layer is not installed, and composed of a water-repellent resin, formed on a head slider surface and head slider protection layer surface, wherein the surface tension of the head lubricant layer determined by the Fowkes equation is not more than those of the head slider protection layer surface and the head slider surface facing the magnetic recording medium, is a head slider to which little amount of contaminants adheres and that has excellent ultra-small floating properties.

A fluororesin has two molecular end groups in a molecule when the molecule is not branched, and has three or more when branched. However, it is not necessary that all of the molecular end groups are trifluoromethyl groups. It can be appropriately decided how much part of the end groups is occupied by trifluoromethyl groups, depending on the actual conditions such as a necessary level of surface tension. It is more preferable that not less than 90% of the molecular ends are trifluoromethyl groups.

It is to be noted that even when such a thin and uniform film is formed, not only contaminants will break down the film, but also the film could be deformed by the air pressure on the operation of the apparatus, if the film is liquid-like. Therefore it is preferable, together with the above-described embodiments, that the head lubricant layer is formed on the head slider surface and head slider protection layer surface as is substantially chemically bonded to these surfaces as described above, that the rate of adhesion of the head lubricant layer to the surfaces is made not less than 85%, that the head slider lubricant layer is formed through subjecting to washing with a solvent, and/or that the head slider lubricant layer is formed through subjecting to irradiation with active energy rays having high energy.

It is known that when a lubricant of a perfluoropolyether family is used, the lubricant tends to easily capture electrons by the irradiation with active energy rays having high energy, with the result that the reaction to be bound to a substrate is facilitated. Accordingly, it is preferable that active energy rays having a higher energy than the work function of the head slider surface and head protection layer surface are irradiated to emit photoelectrons, or electron beams are directly irradiated.

A head lubricant layer as described above can be prepared by known methods for preparing conventional head lubricant layers. The spin coating method and the dip coating (dipping) method are examples. Other treatments such as baking may also be applied as are necessary. Solvent washing and irradiation with active energy rays having high energy may be applied at any stage after the formation of the head lubricant layer.

Any known material used for forming head protection layers and head sliders can be arbitrarily chosen for a head protection layer and a head slider for the present invention, respectively. As a material for a head protection layer, $TiO_2$, $Cr_2O_3$, CrN, WC, TiC, ZrC, SiC, $Al_2O_3$, BN, etc., as well as an amorphous carbon and a diamond-like carbon (DLC) by CVD can be enumerated. As a material for a head slider, $Al_2O_3$—TiC, silicon, sapphire, etc. are enumerated.

In this way, a head slider to which little amount of contaminants adheres and that has excellent ultra-low floating properties can be realized, and accordingly, a miniaturized magnetic recording device having a high recording density can be realized when equipped with this head slider.

This head slider can be applied not only to magnetic recording devices operated by the loading-unloading mechanism or the contact-start-stop mechanism, and by the complete floating method that is currently prevailing, but also to magnetic recording devices operated by the gas-liquid mixing system that is anticipated as a future technology wherein a part of the slider contacts with the medium lubricant layer and another part is floating. It is considered also possible to expand this technology to the contact system wherein part or all of the slider is in contact with the magnetic recording medium.

EXAMPLES

Next, examples and comparative examples according to the present invention will be described in detail. It is to be noted that the rate of adhesion was determined by dividing the thickness of a lubricant layer after it was washed with 2,3-dihydrodecafluoropentane by the thickness of the lubricant layer before the washing.

Example 1

An amorphous carbon protection film was deposited on an AlTiC substrate ($Al_2O_3$—TiC substrate) as a model mimicking a head protection layer. A perfluoropolyether (both molecular end groups being trifluoromethyl groups, and the molecular weight being 9,500) was applied to the surface to form a head lubricant layer having an average film thickness of 1 nm. Then, it was immersed and washed in a solvent, 2,3-dihydrodecafluoropentane for 5 minutes. Afterwards, it was left standing for three days.

Through observation under a microscope with a light diagonally incident on the surface of the head lubricant layer, no coagulation of the lubricant was observed. While the surface tension of a bulk of this lubricant was measured to be 24 mN/m (the pendant-drop method), the surface tension obtained through measuring the contact angles of water and diiodomethane on the lubricant applied to a silicon wafer in a thickness of about 1 nm, and applying the Fowkes equation, was 12.8 mN/m. To compare, the surface tension of the above-described amorphous carbon film by the Fowkes equation was 32.2 mN/m, and the surface tension of the AlTiC substrate by the Fowkes equation was 43 mN/m. The contact angle between the lubricant and water was 118°.

Example 2

An amorphous carbon protection film (the surface tension determined by the Fowkes equation being 32.2 mN/m) was deposited on a head slider composed of $Al_2O_3$—TiC to form a head protection layer. Part of the surface was removed to expose the head slider surface. On the surfaces, a lubricant was applied under the same conditions as for EXAMPLE 1 to form a head lubricant layer (water-repellent resin layer). After a xenon excimer light (the wavelength being 172 nm) was irradiated so that the rate of adhesion was 90%, a floating test was conducted. TOV and TDV were each about 2,055 and about 1,669 rpm, indicating good floating properties. The floating gap was 8.5 nm. The surface tension of the head slider lubricant layer by the Fowkes equation after the irradiation with xenon excimer rays was 24.5 m N/m.

For a disk medium for the floating test, an aluminum substrate was used, and a medium protection layer of an amorphous carbon which was the same as for EXAMPLE 1, and a medium lubricant layer were layered in this order over a magnetic layer. The thickness of the medium lubricant layer was 1 nm, and a perfluoropolyether (molecular weight being 4,000) in which both molecular end groups were hydroxy groups was applied as a lubricant.

Example 3

For a head slider and a disk medium prepared under the same conditions as for EXAMPLE 2, a running test was performed in an atmosphere of 80° C. and 60% RH for 100 hours. There occurred no floating problems such as head slider floating failure, head crash, scratching on the magnetic recording medium, etc., during the running test. The observation of the ABS under an optical microscope after the running rest, revealed no contamination, indicating a normal state.

Comparative Example 1

A sample was prepared according to the same process as for EXAMPLE 1, except that a perfluoropolyether (both molecular end groups being hydroxy groups with a molecular weight of 4,000) was used instead of the lubricant used for EXAMPLE 1, and washing with a solvent was not employed.

Through observation under a microscope with a light diagonally incident on the head lubricant layer surface of the sample that had been left standing for three days after the application, coagulation of the lubricant was observed.

The surface tension of a bulk of this lubricant was determined to be 24 mN/m by the pendant-drop method. However, it was 39 mN/m when obtained by the Fowkes equation from the contact angles of water and diiodomethane measured on the lubricant applied to a silicon wafer in a thickness of about 1 μm. It is to be noted that the contact angle between water and this lubricant was 54°.

When this result is compared with that of EXAMPLE 1, it is understood that the surface tension values of the lubricants were different from each other when they were determined by the Fowkes equation in the same as for EXAMPLE 1, though no difference was detected by the pendant-drop method. It is also understood that regarding the surface tensions determined by the Fowkes equation, a lubricant shows coagulation when its surface tension is larger than those of a head slider surface and head protection layer surface.

Comparative Example 2

A head slider and a disk medium were prepared according the same process as for EXAMPLE 2, except that a head lubricant layer was formed by applying a lubricant to the head slider under the same conditions as for COMPARATIVE EXAMPLE 1. A xenon excimer light was irradiated until the adhesion rate became 90%. Afterwards, the same floating test as for EXAMPLE 2 was conducted. TOV and TDV were each about 3,521 and about 3,290 rpm, indicating no good floating properties were obtained. It was because the floating properties were deteriorated as a result of coagulation of the lubricant at the ABS. It is to be noted that the surface tension of the head slider lubricant layer after irradiation of xenon excimer rays determined by the Fowkes equation was 28.7 mN/m.

Comparative Example 3

A head slider and a disk medium were prepared according the same process as for EXAMPLE 2, except that a head lubricant layer was formed by applying a lubricant to the head slider under the same conditions as for COMPARATIVE EXAMPLE 1, and a xenon excimer light (wavelength: 172 nm) was irradiated until the adhesion rate became 75%. When a running test was performed in an atmosphere of 80° C. and 60% RH for 100 hours in the same way as in EXAMPLE 3, it was found that head crash occurred during the running test. Thus, head crash tends to occur when the adhesion rate of a lubricant applied to a head slider surface and head protection layer surface is not more than 85%.

Example 4

The relationship between the film thickness of the head lubricant layer, and the touchdown altitude and take-off altitude, were studied for a head slider and a disk medium prepared according to the same process as for EXAMPLE 2, except that the film thickness was changed.

The touchdown altitude and take-off altitude are those obtained from the floating gap when the atmosphere was evacuated during the running of the disk medium. Specifically, the values were obtained as follows: first, the head was kept flying; the atmosphere pressure was reduced gradually, while the rotation speed was maintained; the altitude that was converted from the pressure when the head touched the disk, was defined as the touchdown altitude; the pressure was gradually increased afterward; and when the head was detached from the disk, the altitude converted from the pressure was defined as the take-off altitude. This is so-called an altitude ensuring experiment. In general, a higher altitude means a better property for the system, for both the touchdown altitude and take-off altitude.

Figure 6:
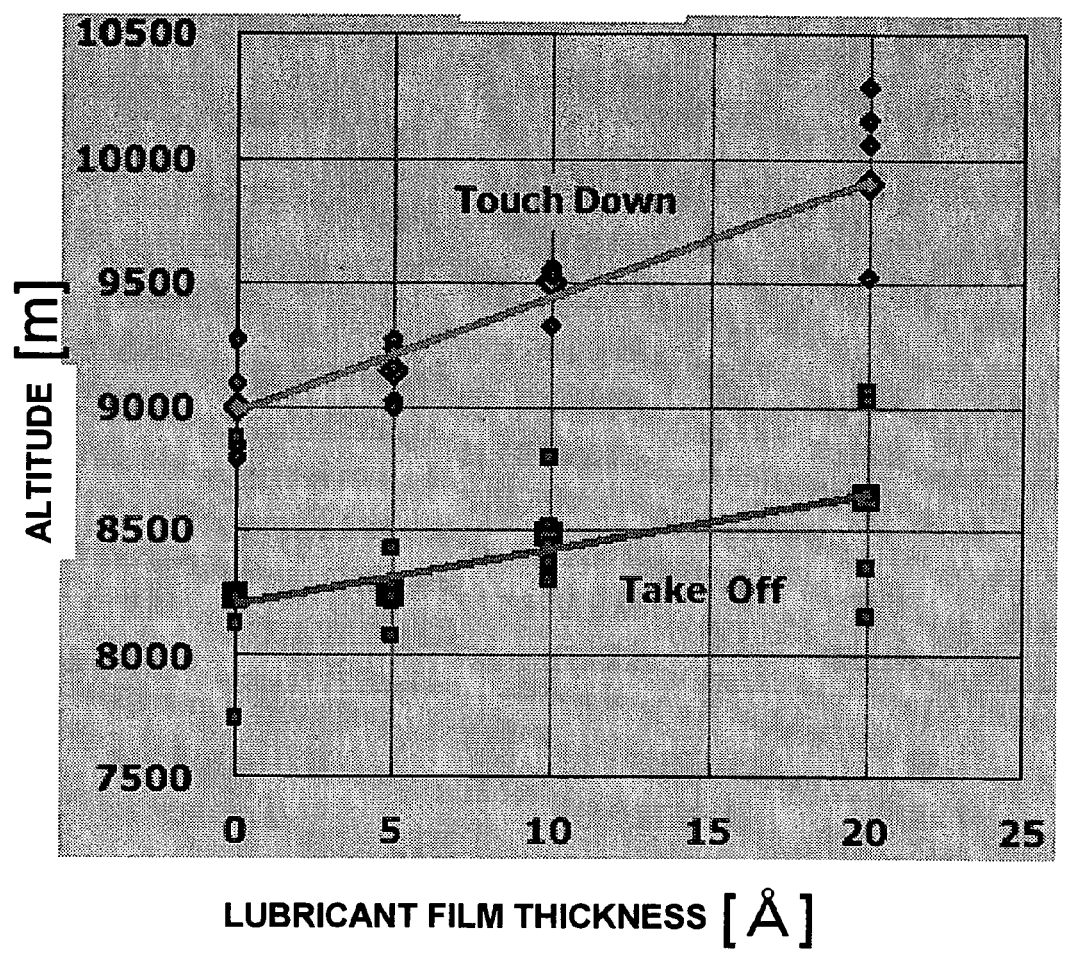
FIG. 6 is a graph showing the relationship between the touchdown altitude and take-off altitude, and the film thickness of the head lubricant layer.

From FIG. 6, it is evident that the larger the film thickness, the better the altitude ensuring property. It was found that 2 nm or more was favorable in this experiment.

Example 5

Figure 7:
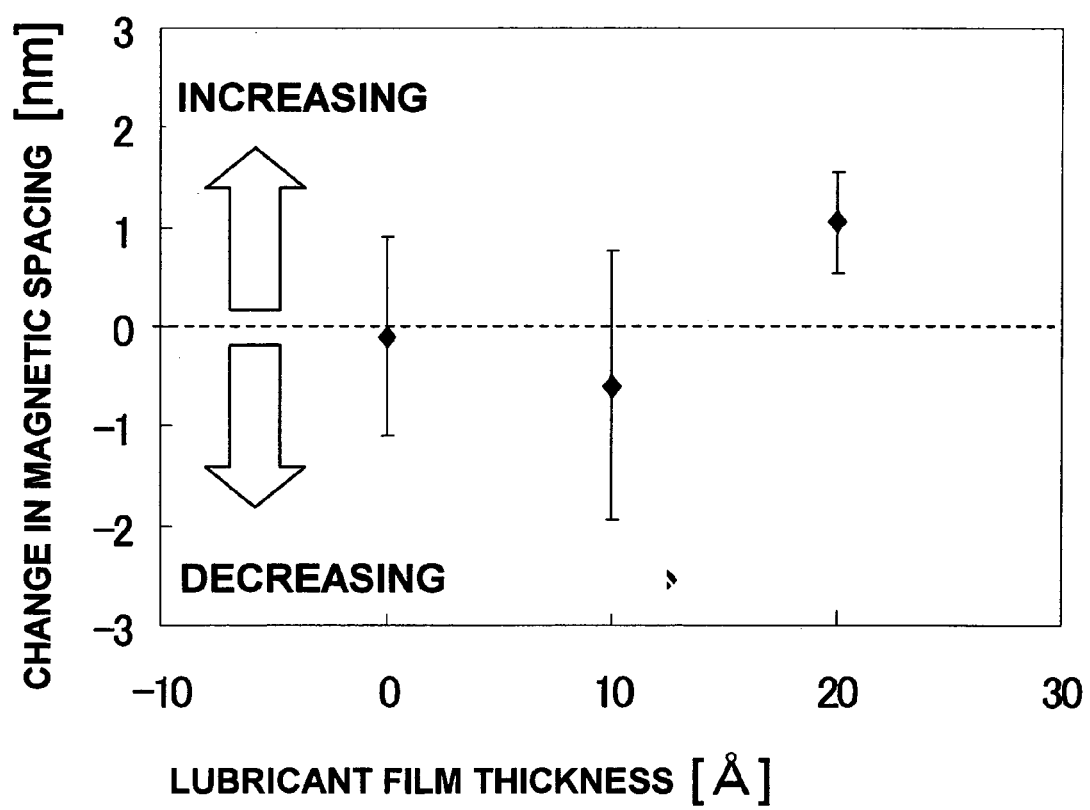
FIG. 7 is a graph showing the effect of the film thickness of the head lubricant layer on the magnetic spacing.

The relationship between the change of magnetic spacing obtained from the magnetic transducing properties, and the film thickness were studied for a head slider and a disk medium prepared according to the same process as for EXAMPLE 2, except that the film thickness was changed. FIG. 7 shows the result.

The following equation was used to obtain the change of magnetic spacing from the magnetic transducing properties. Here, Δd is a change of magnetic spacing, v is a peripheral velocity of the medium, f is the read-in frequency, R1 is a read-in output before the treatment, and R2 is a read-in output after the treatment.

$$\Delta d = v/(2\pi f) \times ln(R1/R2)$$

In FIG. 7, the magnetic spacing at the film thickness=0 (indicated by "0") is a magnetic spacing when no head lubricant layer is installed. Up-to-down lines about respective points (♦) indicate the range of data fluctuation.

From FIG. 7, it was found that the magnetic spacing decreased at the film thickness of 1.0 nm, and increased at the film thickness of 2.0 nm.

When the head lubricant layer is taken as a simple solid layer, the magnetic spacing should increase as long as the head lubricant layer is present, even though the film thickness is only 1.0 nm. Therefore, the desirable result that the magnetic spacing decreased when the film thickness was 1.0 nm was out of our expectation. It was probably due to restriction of the migration of the lubricant from the medium lubricant layer to the head spacer.

It is to be noted that although the magnetic spacing became larger at the film thickness of 2.0 nm, the altitude ensuring effect was large in this case as shown in EXAMPLE 3. Accordingly, it is possible to consider that this level may be in an acceptable range. Since the statistical fluctuation of the film thickness is about 30% at a maximum, a range up to about 2.5 nm may be acceptable when it is taken into consideration.

The floating gap was 12 nm when there was no head slider lubricant layer on the head. Accordingly, on the basis of the relationship with the floating gap when no head lubricant layer is installed, 2.5/12=0.20, indicating that it is preferable to consider that a head slider lubricant layer is acceptable that has an average film thickness of not more than 20% of the floating gap that is provided when the head slider lubricant layer is not installed.

Example 6

Using a head slider and a disk medium prepared according to the same process as for EXAMPLE 2, except that the film thickness was changed to 2.0 nm and 2.5 nm, the running test was conducted at 80° C. and 60% RH, for 100 hours. There was no flying drawbacks such as failure for the head slider to fly, head crashing, and damaging of the magnetic recording medium, during the running test. When the ABS after the running test was observed under an optical microscope, there was no smear, indicating the system was in a normal condition.

What is claimed is:

1. A head slider equipped with a record transducer (or a head) for recording information onto and/or reproducing information from a magnetic recording medium, wherein:
   a head slider lubricant layer having an average film thickness of not more than 2.5 nm, and composed of a water-repellent resin, is formed on a head slider surface and head slider protection layer surface facing the magnetic recording medium; and
   the surface tension of the head slider lubricant layer determined by the Fowkes equation is not more than those of the head slider surface and head slider protection layer surface.

2. A head slider according to claim 1, wherein said head slider lubricant layer comprises a fluororesin.

3. A head slider according to claim 1, wherein said head slider lubricant layer is substantially chemically bonded to the head slider surface and head slider protection layer surface.

4. A head slider according to claim 1, wherein the rate of adhesion of the head slider lubricant layer to the head slider surface and head slider protection layer surface is not less than 85%.

5. A head slider according to claim 1, wherein said head slider lubricant layer is formed through subjecting to washing with a solvent.

6. A head slider according to claim 1, wherein said head slider lubricant layer is formed through subjecting to irradiation with active energy rays having high energy.

7. A head slider according to claim 5, wherein said active energy rays having high energy are xenon excimer rays or electron beams.

8. A head slider according to claim 7, wherein not less than 90% of the molecular end groups of said fluororesin are trifluoromethyl groups.

9. A head slider according to claim 7, wherein said fluororesin is a fluorinated hydrocarbon that may be branched, a fluorinated polyether that may be branched, or a mixture thereof.

10. A head slider according to claim 7, wherein at least part of the molecular end groups of said fluororesin are trifluoromethyl groups.

11. A magnetic recording device equipped with a head slider according to claim 1.

12. A magnetic recording device according to claim 11, wherein said head slider records and/or reproduces information by a process selected from the group consisting of the complete floating method, the gas-liquid mixing method and the contact method.

13. A magnetic recording device according to claim 11, wherein said head slider is operated by the loading-unloading mechanism or the contact-start-stop mechanism.

14. A head slider equipped with a record transducer (or a head) for recording information onto and/or reproducing information from a magnetic recording medium, wherein:
   a head slider lubricant layer having an average film thickness of not more than 20% of the floating gap that is provided when the head slider lubricant layer is not installed, and composed of a water-repellent resin, is formed on a head slider surface and head slider protective layer surface facing the magnetic recording medium; and
   the surface tension of the head slider lubricant layer determined by the Fowkes equation is not more than those of the head slider surface and head slider protective layer

* * * * *